(12) United States Patent
Zhang et al.

(10) Patent No.: US 12,299,488 B2
(45) Date of Patent: May 13, 2025

(54) METHOD AND APPARATUS FOR SEGMENTING GPU RESOURCES INTO VIRTUAL PROCESSING RESOURCE TYPES AND ALLOCATING TO DIFFERENT TARGET TASKS

(71) Applicant: Beijing Bytedance Network Technology Co., Ltd., Beijing (CN)

(72) Inventors: Zongqiang Zhang, Beijing (CN); Sikai Qi, Beijing (CN); Zhiyi Xia, Beijing (CN); Siyang Li, Beijing (CN); Shengli Liu, Beijing (CN); Zishuai Lou, Beijing (CN); Binbin Xu, Beijing (CN); Zherui Liu, Beijing (CN); Jian Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/542,245

(22) Filed: Dec. 15, 2023

(65) Prior Publication Data

US 2024/0118928 A1  Apr. 11, 2024

Related U.S. Application Data

(63) Continuation of application No. PCT/CN2022/124608, filed on Oct. 11, 2022.

(30) Foreign Application Priority Data

Nov. 9, 2021 (CN) .......................... 202111322466.X

(51) Int. Cl.
*G06F 9/50* (2006.01)
(52) U.S. Cl.
CPC ................... *G06F 9/5016* (2013.01)

(58) Field of Classification Search
CPC .... G06F 9/5016; G06F 9/5027; G06F 9/5077; G06F 2209/5011; G06F 9/50
See application file for complete search history.

(56) References Cited

U.S. PATENT DOCUMENTS 9,836,330 B2 * 12/2017 Chen ..................... G06F 9/5055
2006/0149526 A1 * 7/2006 Torossian ................ G06F 30/33
 703/16

(Continued)

FOREIGN PATENT DOCUMENTS

CN 101133396 A 2/2008
CN 109213593 A 1/2019

(Continued)

OTHER PUBLICATIONS

CN112114959A, English Translation (Year: 2020).*

(Continued)

*Primary Examiner* — Meng Ai T An
*Assistant Examiner* — Willy W Huaracha
(74) *Attorney, Agent, or Firm* — Astute IP Law Group

(57) ABSTRACT

The present disclosure provides a resource allocation method and apparatus, a readable medium and an electronic device. The method includes: acquiring a target resource type corresponding to a target task; acquiring a plurality of resource types of a target processor, wherein each resource type corresponds to one or more virtual processor resources of the target processor; determining a specified resource type that is identical to the target resource type from the plurality of resource types; determining a target processor resource from one or more virtual processor resources corresponding to the specified resource type; and allocating the target processor resource to the target task.

19 Claims, 4 Drawing Sheets

(56) References Cited

U.S. PATENT DOCUMENTS

| | | | |
|---|---|---|---|
| 2015/0026342 A1* | 1/2015 | Chen | G06F 9/5055 |
| | | | 709/226 |
| 2019/0319895 A1* | 10/2019 | Zeng | H04L 47/72 |
| 2021/0208951 A1* | 7/2021 | He | G06F 9/5044 |
| 2021/0218690 A1 | 7/2021 | Yang | |

FOREIGN PATENT DOCUMENTS

| | | |
|---|---|---|
| CN | 110764901 A | 2/2020 |
| CN | 110941481 A | 3/2020 |
| CN | 111506419 A | 8/2020 |
| CN | 111580974 A | 8/2020 |
| CN | 111913794 A | 11/2020 |
| CN | 112905342 A | 6/2021 |
| CN | 114020470 A | 2/2022 |
| CN | 114020470 B | 4/2024 |

OTHER PUBLICATIONS

CN113051054, English Translation (Year: 2021).*
CN110442451 (A) English Translation (Year: 2019).*
Khan et al., "Smart Scheduler for CUDA programming in Heterogeneous CPU/GPU Environment", Proceedings of the 11th International Conference on Computer Modeling and Simulation, Jan. 16, 2019, 4 pages.
Yangang et al., "Research and Application of A Platform for Artificial Intelligence Computing and Data Services", Frontiers of Data & Computing, vol. 1, No. 2, Jan. 15, 2020, 12 pages, with English Abstract.
Notice of Allowance for Chinese Patent Application No. 202111322466.X, mailed Mar. 28, 2024, 6 pages.

* cited by examiner

METHOD AND APPARATUS FOR SEGMENTING GPU RESOURCES INTO VIRTUAL PROCESSING RESOURCE TYPES AND ALLOCATING TO DIFFERENT TARGET TASKS

CROSS REFERENCE TO RELATED APPLICATIONS

The present application is a continuation of International Patent Application No. PCT/CN2022/124608, filed on Oct. 11, 2022, which claims priority of Chinese Patent Application No. 202111322466.X, filed on Nov. 9, 2021, and the entire content disclosed by the Chinese patent application is incorporated herein by reference as part of the present application.

TECHNICAL FIELD

The present disclosure relates to the technical field of computers, and in particular to a resource allocation method and apparatus, a readable medium and an electronic device.

BACKGROUND

With the rapid development of artificial intelligence and machine learning, machine learning needs a lot of computing resources. GPU (Graphics Processing Unit) has better performance than CPU (Central Processing Unit) in the work of machine learning training tasks, and thus GPU has become a mainstream machine learning processor at present. The GPU may include computing resources, through which the computing and execution of machine learning tasks can be realized, and encoding-decoding resources, through which the hardware-based video encoding and decoding capabilities can be realized. In related arts, the computing resources and the encoding-decoding resources of one physical GPU can only be allocated to the same task at the same time, which leads to the low resource utilization rate of the GPU.

SUMMARY

This content section is provided to introduce concepts in a brief form, which will be described in detail in the detailed description section later. This content section is not intended to identify key features or essential features of the claimed technical solution, nor is it intended to limit the scope of the claimed technical solution.

According to a first aspect of the present disclosure, a resource allocation method is provided. The method includes:
  acquiring a target resource type corresponding to a target task;
  acquiring a plurality of resource types of a target processor, wherein each resource type corresponds to one or more virtual processor resources of the target processor;
  determining a specified resource type that is identical to the target resource type from the plurality of resource types;
  determining a target processor resource from one or more virtual processor resources corresponding to the specified resource type; and
  allocating the target processor resource to the target task.

According to a second aspect of the present disclosure, a resource allocation apparatus is provided. The apparatus includes:
  a target resource type acquisition module, configured to acquire a target resource type corresponding to a target task;
  a processor resource type acquisition module, configured to acquire a plurality of resource types of a target processor, wherein each resource type corresponds to one or more virtual processor resources of the target processor;
  a specified resource type determination module, configured to determine a specified resource type that is identical to the target resource type from the plurality of resource types;
  a target processor resource determination module, configured to determine a target processor resource from one or more virtual processor resources corresponding to the specified resource type; and
  a resource allocation module, configured to allocate the target processor resource to the target task.

According to a third aspect of the present disclosure, a computer-readable medium is provided. The computer-readable medium stores a computer program, and when the computer program is executed by a processing apparatus, steps of the method described in the first aspect of the present disclosure are implemented.

According to a fourth aspect of the present disclosure, an electronic device is provided. The electronic device includes:
  a storage apparatus storing a computer program; and
  a processing apparatus, configured to execute the computer program on the storage apparatus to implement steps of the method in the first aspect of the present disclosure.

By adopting the technical solution: acquiring a target resource type corresponding to a target task; acquiring a plurality of resource types of a target processor, wherein each resource type corresponds to one or more virtual processor resources of the target processor; determining a specified resource type that is identical to the target resource type from the plurality of resource types; determining a target processor resource from one or more virtual processor resources corresponding to the specified resource type; and allocating the target processor resource to the target task. In this way, the virtual processor resources of different resource types on a same target processor can be allocated to different target tasks, that is, a plurality of target tasks can use the same target processor in parallel, which improves the resource utilization rate of the processor and also improves the multi-task execution efficiency.

Other features and advantages of the present disclosure will be described in detail in the following detailed description.

BRIEF DESCRIPTION OF THE DRAWINGS

The above and other features, advantages, and aspects of embodiments of the present disclosure will become more apparent from the following detailed description when taken in conjunction with the accompanying drawings. Throughout the drawings, the same or similar reference numbers indicate the same or similar elements. It should be understood that the drawings are schematic and that components and elements are not necessarily drawn to scale. In the drawings.

DETAILED DESCRIPTION

Figure 1:
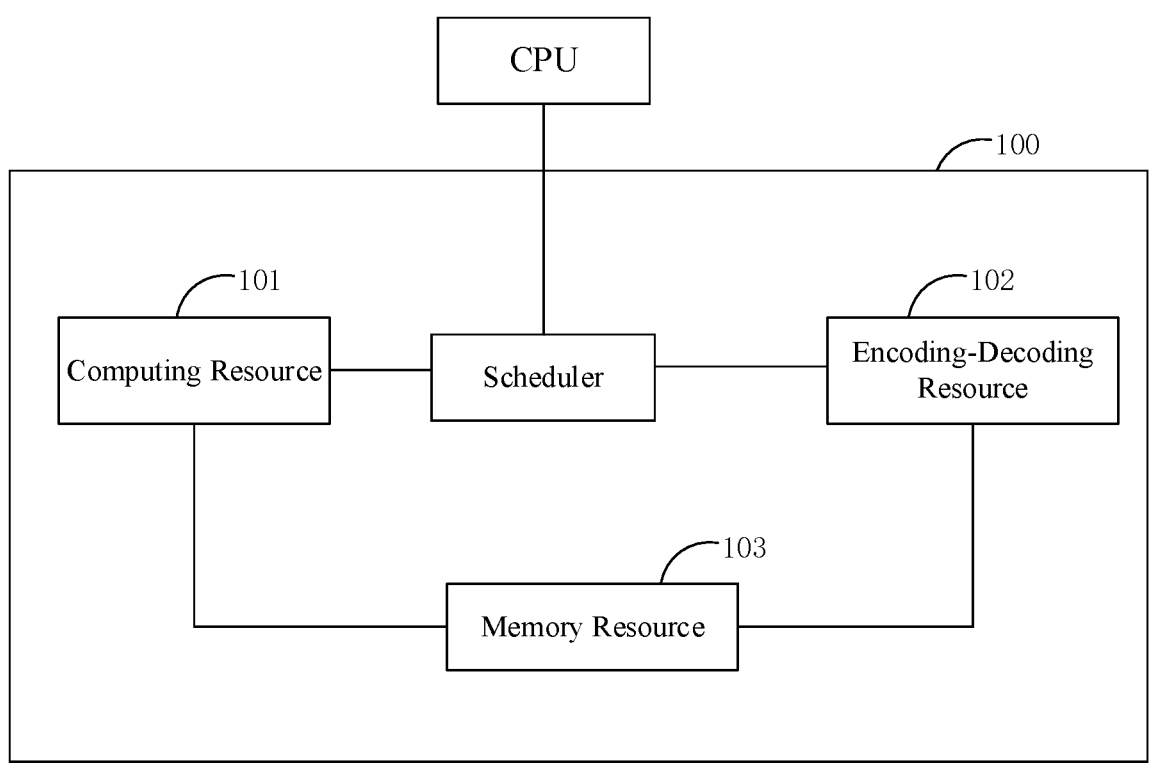
FIG. 1 is a schematic structural diagram of a GPU illustrated according to an exemplary embodiment.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including" or "comprising" and its variants are open-ended including, that is, "including but not limited to". The term "based on" or "according to" is "at least partially based on". The term "one embodiment" or "an embodiment" means "at least one embodiment"; the term "another embodiment" means "at least one other embodiment"; the term "some embodiments" means "at least some embodiments". Related definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "a" and "a plurality of" mentioned in this disclosure are schematic rather than limiting, and those skilled in the art should understand that unless the context clearly indicates otherwise, they should be understood as "one or more".

Names of messages or information exchanged among multiple devices in the embodiment of the present disclosure are only used for illustrative purposes, and are not used to limit the scope of these messages or information.

First, an application scenario of the present disclosure is explained. The present disclosure can be applied to resource allocation scenarios, especially to resource allocation scenarios of a GPU. FIG. 1 is a schematic structural diagram of a GPU 100 according to an exemplary embodiment. As shown in FIG. 1, the GPU 100 may include a computing resource 101 and an encoding-decoding resource 102, wherein the computing resource 101 may include a Cuda Core and a Tensor Core in hardware, and the encoding-decoding resource 102 may include a hardware-based decoder and encoder(s). Optionally, the GPU may further include a memory resource 103, and both the computing resource 101 and the encoding-decoding resource 102 may call the memory resource 103 to execute related task instructions. In addition, the GPU may further include a scheduler (GPU scheduler), and the GPU and CPU can interact with each other in instructions through the scheduler. In related arts, the computing resource and the encoding-decoding resource of one physical GPU may only be allocated to a same task at the same time. However, a current machine learning task mainly uses computing resources such as Cuda Core and Tensor Core that provide powerful computing capability, while the encoding-decoding resource has been in an idle status for a long time during the operation of the machine learning task; furthermore, a multimedia encoding-decoding task mainly uses the encoding-decoding resource of the GPU, and generally does not need to use or rarely uses the computing resources such as Cuda Core and Tensor Core. Therefore, the resource utilization rate of GPU is low, which reduces the multi-task execution efficiency.

In order to solve the above problems, the present disclosure provides a resource allocation method and apparatus, a readable medium and an electronic device. According to the present disclosure, a target processor can be divided into a plurality of virtual processor resources of different resource types, a target resource type corresponding to a target task is acquired, and different virtual processor resources are allocated to different target tasks, so that the virtual processor resources of different resource types on a same target processor can be allocated to different target tasks, that is, a plurality of target tasks can use the same target processor in parallel, which improves the resource utilization rate of the processor and also improves the multi-task execution efficiency.

Hereinafter, specific embodiments of the present disclosure will be described in detail with reference to the accompanying drawings.

Figure 2:
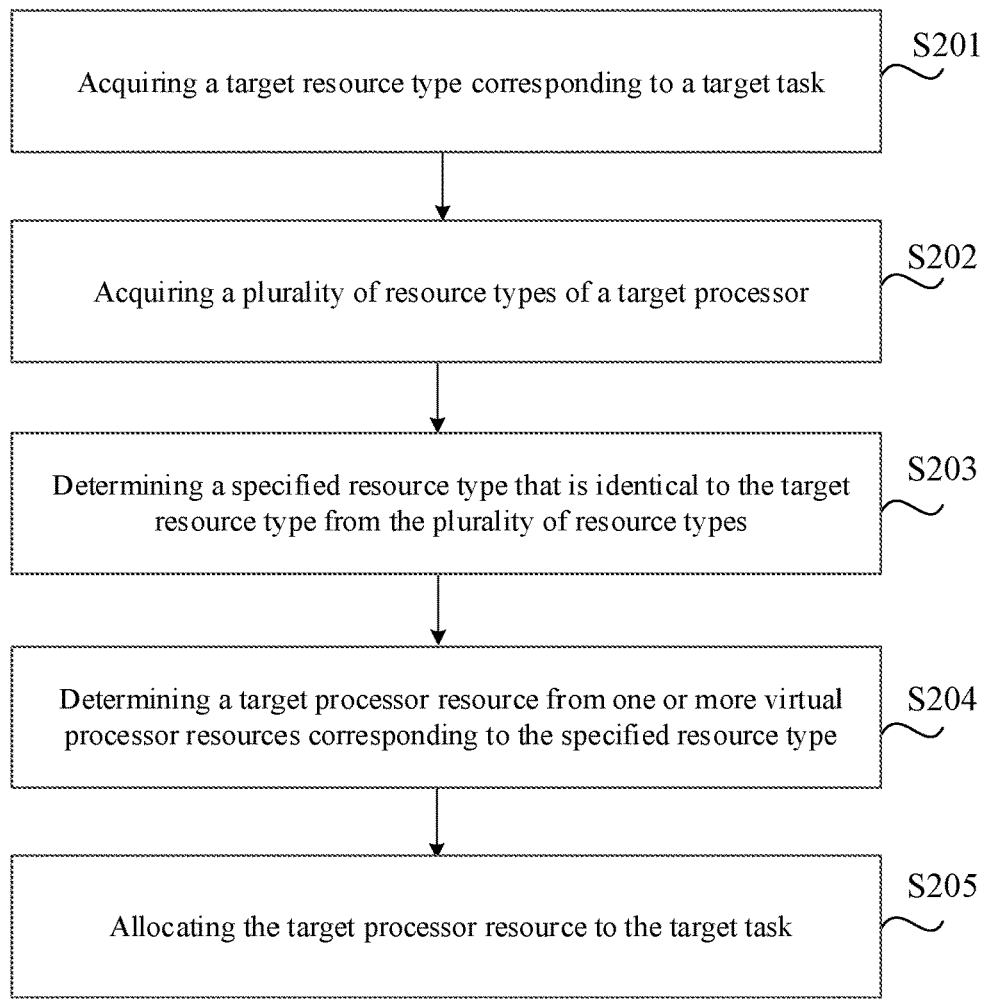
FIG. 2 is a flowchart of a resource allocation method illustrated according to an exemplary embodiment.

FIG. 2 is a resource allocation method illustrated according to an exemplary embodiment. As shown in FIG. 2, the method includes the following steps.

Step 201: acquiring a target resource type corresponding to a target task.

For example, the target task includes a machine learning task or a multimedia encoding-decoding task, the target resource type corresponding to the machine learning task may be a computing resource, and the resource type corresponding to the multimedia encoding-decoding task may be an encoding-decoding resource.

Step 202: acquiring a plurality of resource types of a target processor.

Each resource type corresponds to one or more virtual processor resources of the target processor.

For example, the target processor may be a GPU, and the plurality of resource types may include the computing resource and the encoding-decoding resource. Further, the computing resource may correspond to M virtual processor resources, and M is greater than or equal to 1. The encoding-decoding resource may correspond to N virtual processor resources, and N also is greater than or equal to 1.

Step 203: determining a specified resource type that is identical to the target resource type from the plurality of resource types.

Step 204: determining a target processor resource from one or more virtual processor resources corresponding to the specified resource type.

Step 205: allocating the target processor resource to the target task.

For example, in a case where the target task is a machine learning task, the machine learning task mainly uses the computing resource, thus the target resource type corresponding to the machine learning task may be a computing resource, the above-mentioned specified resource type is determined as the computing resource from the plurality of resource types of the target processor, the target processor resource is determined from one or more virtual processor resources corresponding to the computing resource, and the target processor resource is allocated to the target task.

In a case where the target task is a multimedia encoding-decoding task, the multimedia encoding-decoding task mainly uses the encoding-decoding resource, thus the target resource type corresponding to the encoding-decoding task may be an encoding-decoding resource, the above-mentioned specified resource type is determined as the encoding-decoding resource from the plurality of resource types of the target processor, the target processor resource is determined from one or more virtual processor resources corresponding to the encoding-decoding resource, and the target processor resource is allocated to the target task.

Further, the number of the target tasks may be plural; and in a case where the number of the target tasks is plural, the steps from step 201 to step 205 may be executed for each of the plurality of target tasks, so as to allocate the target processor resource for each target task. For example, in a case where the above-mentioned target tasks include a machine learning task and an encoding-decoding task, the steps from step 201 to step 205 may be executed for the two target tasks respectively, so as to allocate a virtual processor resource with the resource type being computing resource to the machine learning task, and allocate a virtual processor resource with the resource type being encoding-decoding resource to the encoding-decoding task. Thus, the effect that the plurality of target tasks use different virtual processor resources on the same target processor is realized, and the resource utilization rate of the processor is improved.

By adopting the technical solution: acquiring a target resource type corresponding to a target task; acquiring a plurality of resource types of a target processor, wherein each resource type corresponds to one or more virtual processor resources of the target processor; determining a specified resource type that is identical to the target resource type from the plurality of resource types; determining a target processor resource from one or more virtual processor resources corresponding to the specified resource type; and allocating the target processor resource to the target task. In this way, the virtual processor resources of different resource types on a same target processor can be allocated to different target tasks, that is, the plurality of target tasks can use the same target processor in parallel, which improves the resource utilization rate of the processor and also improves the multi-task execution efficiency.

Further, the step 204 of determining the target processor resource from one or more virtual processor resources corresponding to the specified resource type may include the following steps.

Firstly, one or more idle processor resources without being subjected to task allocation are acquired from the virtual processor resource corresponding to the specified resource type.

For example, a current resource status, including an idle status, an occupied status and a fault status, of each virtual resource processor may be acquired, wherein the fault status indicates that the virtual processor resource cannot be allocated to the target task for use; the idle status indicates the virtual processor resource is not faulty and has not been subjected to task allocation; and the occupied status indicates the virtual processor resource has been allocated. In this way, according to the resource status, one or more virtual processor resources with the idle resource status may be acquired as the above-mentioned idle processor resource from the virtual processor resource corresponding to the specified resource type.

Then, in a case where the number of the idle processor resource is one, the idle processor resource is taken as the target processor resource; or, in a case where the number of the idle processor resources is plural, one of a plurality of idle processor resources is selected as the target processor resource according to a preset selection rule.

For example, the preset selection rule may include random selection or sequential selection; in a case where the preset selection rule is random selection, one of the plurality of idle processor resources may be randomly selected as the target processor resource; and in a case where the preset selection rule is sequential selection, one idle processor resource with higher-ranking may be selected as the target processor resource according to a preset order of the idle processor resources. The preset order may be an order set when the target processor is divided into the plurality of virtual processor resources.

Further, in a case where the idle processor resource cannot be acquired from all virtual processor resources of the target processor, the allocation of processor resources to the target task fails this time, and a reason for the failure can be returned to the target task as insufficient processor resources; and the allocation of processor resources to the target task can be initiated again after waiting for a preset time.

In this way, the idle processor resource can be allocated to the target task, resource conflicts between different target tasks can be avoided, and reasonable allocation of the processor resources is realized.

In another embodiment of the present disclosure, the above-mentioned virtual processor resources of the different resource types can be acquired by dividing the target processor by a resource management module, for example, the resource management module may be Kubernetes. It should be noted that in the management of a GPU cluster, Kubernetes may be a background process running on computing nodes of the GPU cluster, which is used to realize the functions of discovering, exposing and allocating virtual processor resources. Certainly, Kubernetes can also be used for the management of CPU and other processors.

Further, the resource management module may provide a first API (application programming interface) and a second API, wherein:

The first API can acquire information of the plurality of virtual processor resources in the target processor and update a resource status of each virtual processor resource in real time. For example, when the GPU is started, through the first API, the GPU may be divided into a first virtual processor resource with the resource type being the computing resource and a second virtual processor resource with the resource type being the encoding-decoding resource.

It should be noted that NVIDIA has also written plug-ins for managing and scheduling GPU resources to enable Kubernetes to allocate the GPU resources, for example, to acquire GPU resource information using a ListAndWatch function, but in ListAndWatch, the GPU resources can only be allocated as a whole. In this embodiment, the first API can modify the ListAndWatch function, divide the GPU into a plurality of virtual processor resources of different resource types according to the resource types, and generate meta information of each virtual processor resource. The meta information may include resource type of the virtual processor resource, resource identification of the virtual processor resource, resource status of the virtual processor resource and resource quantity of the virtual processor resource. For example, the resource type may include a computing resource (which may be labeled as nvidia.com/gpu) and an encoding-decoding resource (which may be labeled as nvidia.com/codec); and the resource identification may be numbered from 1 to K, where K is the number of virtual processor resources. The resource status may include an idle status, an occupied status and a fault status; and the resource quantity may include the computing capability.

Further, through the first API, the plurality of virtual processor resources of the target processor may be displayed, so that the user can determine the resource usage of the target processor through display information.

The second API can allocate a virtual processor resource for the target task according to a request of the target task.

For example, when the target task creates a container instance, a target resource type corresponding to the target task can be acquired through the second API, and the virtual processor resource is allocated to the target task according to the target resource type.

Further, in a case where both the machine learning task and the encoding-decoding task request to create container instances, the virtual processor resources of different resource types on the same target processor can be allocated to different tasks; for example, the first virtual processor resource with the computing resource type on the target processor is allocated to the machine learning task, and the second virtual processor resource with the encoding-decoding resource type is allocated to the encoding-decoding task.

In this way, the machine learning task can use the first virtual processor resource, and the encoding-decoding task can use the second virtual processor resource, so that both the first virtual processor resource and the second virtual processor resource can be used in parallel and do not interfere with each other, thereby improving the utilization rate of the processor resources.

In the machine learning task and the encoding-decoding task using processor resources of the GPU, the encoding-decoding task mainly uses encoding-decoding resources of the GPU, and uses a small amount of computing resources. At this time, special virtual processor resources of the computing resource type may be allocated to the encoding-decoding task. However, the encoding-decoding task uses few resources, so in order to further improve the utilization efficiency of the processor resources, in another embodiment of the present disclosure, the target processor further includes shared processor resources; and the resource allocation method may further include:

acquiring an idle number of the shared processor resource of the target processor; acquiring a required number of the shared processor resource of the target task; and allocating a shared processor resource to the target task according to the idle number and the required number, wherein, the number of the shared processor resources may be expressed by the computing capability.

In a case where the idle number is greater than or equal to the required number, the required number of the shared processor resource may be allocated to the target task.

Further, in a case where the idle number is less than the required number, the shared processor resource may be allocated in the following ways.

Firstly, a target difference between the required number and the idle number is acquired.

Secondly, one or more first candidate tasks are acquired from tasks currently using the shared processor resource of the target processor according to a task priority.

The task priority of the first candidate task is lower than the task priority of the target task.

It should be noted that the task priority may be preset for each task. For example, the machine learning task usually requires lower latency and higher QPS (Queries Per Second); however, the encoding-decoding task is usually an offline task, and can be retried for many times even if the task fails due to resource problems, without great influence. Therefore, the task priority of the encoding-decoding task may be set lower than the task priority of the machine learning task. In this way, in a case where the target task is a machine learning task, one or more encoding-decoding tasks may be acquired as the above-mentioned one or more first candidate tasks.

Further, in the above-mentioned process of selecting the one or more first candidate tasks, all tasks with task priorities lower than the task priority of the target task can be taken as the second candidate tasks from the tasks currently using the shared processor resources of the target processor; then, among the second candidate tasks, third candidate tasks are selected in sequence according to a usage number of shared processor resources in use from large to small until a sum value of the usage numbers of shared processor resources of the selected third candidate tasks is greater than or equal to the target difference, and the third candidate tasks are taken as the first candidate tasks; or, until all the second candidate tasks are selected as the third candidate tasks, when the sum value of the usage numbers of shared processor resources of the third candidate tasks is still less than the target difference, and the second candidate tasks can be taken as the first candidate tasks.

Thirdly, the shared processor resource currently used by the one or more first candidate tasks is released, so as to increase the idle number of the shared processor resource of the target processor.

Finally, in a case where the increased idle number of shared processor resources is greater than or equal to the required number, allocate the shared processor resource for the target task according to the required number; or, in a case where the increased idle number of shared processor resources is less than the required number, allocate shared processor resources for the target task according to the increased idle number of shared processor resources.

In this way, the shared processor resource can be reasonably allocated by the above-mentioned mode to meet the resource requirements of target tasks with different task priorities and further improve the resource utilization rate of the processor.

In another embodiment of the present disclosure, the target processor is a GPU, the resource types may include a computing resource and an encoding-decoding resource; the target tasks may include a machine learning task and a multimedia encoding-decoding task, the target resource type corresponding to the machine learning task is the computing resource, and the resource type corresponding to the multimedia encoding-decoding task is the encoding-decoding resource.

Further, in order to prevent the multimedia encoding-decoding task from occupying too much shared processor resources, the following operations may be performed for the multimedia encoding-decoding task.

Firstly, in a case where the target task is a multimedia encoding-decoding task, a task suspension operation is executed, and the task suspension operation is used for suspending the multimedia encoding-decoding task.

Secondly, the multimedia encoding-decoding task is scheduled after a suspension time of the multimedia encoding-decoding task reaches a preset suspension time.

For example, the task suspension operation may include performing a sleep operation within a function for scheduling the multimedia coding task, and an input parameter of the sleep operation is the preset suspension time, so that the multimedia encoding-decoding task can be suspended for the preset suspension time and the GPU utilization rate of the multimedia encoding-decoding task can be reduced. More shared processor resources are released for the machine learning task.

In another embodiment of the present disclosure, the target processor further includes memory resources, which are also needed in the operation of the target task. In order to avoid a conflict caused when a plurality of target tasks use the memory resources of the same target processor, for each target task, a memory resource number corresponding to the target resource type may be allocated to the target task according to a preset resource type-memory correspondence, and the preset resource type-memory correspondence includes a preset correspondence between the target resource type and the memory resource number.

For example, the preset resource type-memory correspondence may include the following: a memory resource number corresponding to the encoding-decoding resource is a first preset memory number; and a memory resource number corresponding to the computing resource is a second preset memory number, wherein the first preset memory number may be less than the second preset memory number. For example, for a GPU with a total memory resource of 16 Gbit, the first preset memory number may be 1 Gbit and the second preset memory number may be 15 Gbit.

Further, in a case where the number of machine learning tasks corresponding to the computing resource is plural, the plurality of machine learning tasks may share the second preset memory number of memory resources, and may also equally allocate the second preset memory number of memory resources to the plurality of machine learning tasks. Similarly, in a case where the number of the encoding-decoding tasks corresponding to the encoding-decoding resource is plural, the plurality of encoding-decoding tasks may also share the first preset memory number of memory resources, and may also equally allocate the first preset memory number of memory resources to the plurality of encoding-decoding tasks.

In addition, it should be noted that the memory resource number can indicate a maximum memory amount that can be used by the target task.

In this way, a situation that the operation of the machine learning task with a higher priority is affected due to the fact that the encoding-decoding task with a lower priority occupy too much memory resources can be avoided.

Figure 3:
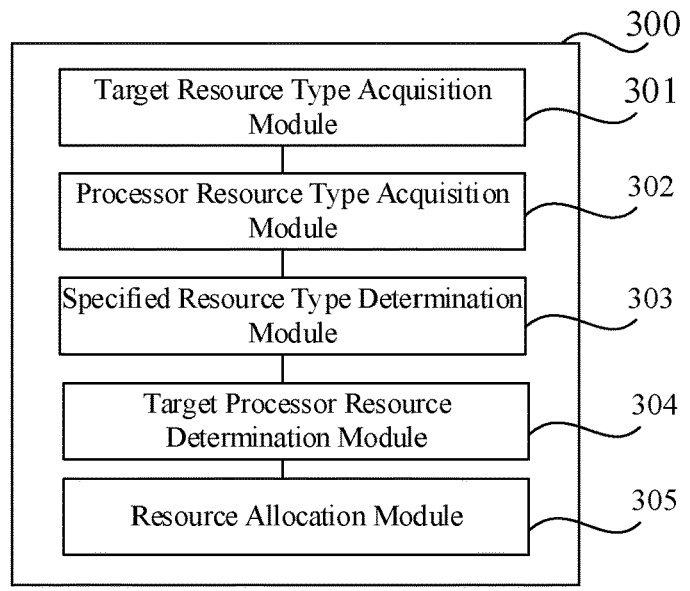
FIG. 3 is a block diagram of a resource allocation apparatus illustrated according to an exemplary embodiment.

FIG. 3 is a block diagram of a resource allocation apparatus illustrated according to an exemplary embodiment. As shown in FIG. 3, the resource allocation apparatus includes:

a target resource type acquisition module 301, configured to acquire a target resource type corresponding to a target task;

a processor resource type acquisition module 302, configured to acquire a plurality of resource types of a target processor, wherein each resource type corresponds to one or more virtual processor resources of the target processor;

a specified resource type determination module 303, configured to determine a specified resource type that is identical to the target resource type from the plurality of resource types;

a target processor resource determination module 304, configured to determine a target processor resource from one or more virtual processor resources corresponding to the specified resource type; and a resource allocation module 305, configured to allocate the target processor resource to the target task.

In some embodiments, the target processor resource determination module 304 is configured to: acquire one or more idle processor resources without being subjected to task allocation from the virtual processor resources corresponding to the specified resource type; and in a case where the number of the idle processor resource is one, take the idle processor resource as the target processor resource; or, in a case where the number of the idle processor resources is plural, select one of a plurality of idle processor resources as the target processor resource according to a preset selection rule.

In some embodiments, the target processor resource determination module 304 is specifically configured to:

randomly select one of the plurality of idle processor resources as the target processor resource in a case where the preset selection rule is random selection; or, select one idle processor resource with higher-ranking as the target processor resource according to a preset order of the idle processor resources in a case where the preset selection rule is sequential selection.

Figure 4:
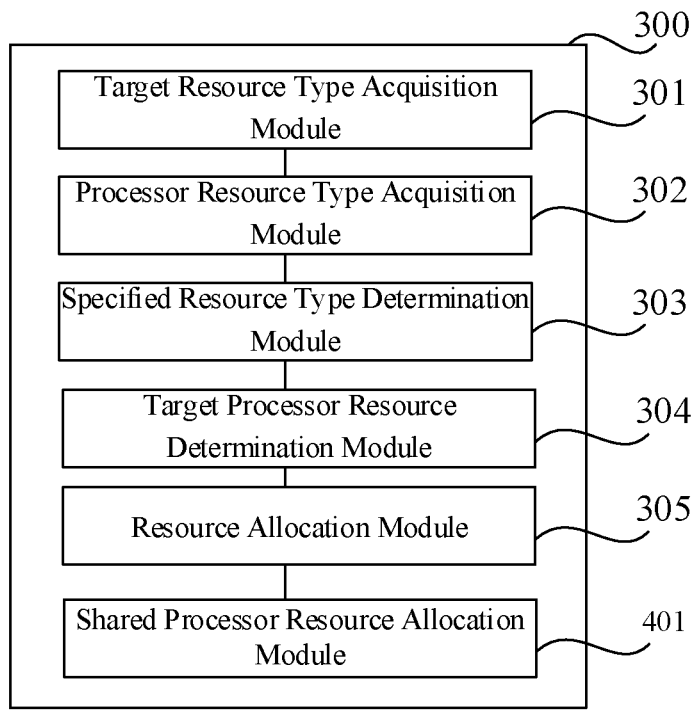
FIG. 4 is a block diagram of another resource allocation apparatus illustrated according to an exemplary embodiment.

FIG. 4 is a block diagram of another resource allocation apparatus illustrated according to an exemplary embodiment. As shown in FIG. 4, the target processor further includes a shared processor resource; and the apparatus further includes:

a shared processor resource allocation module 401, configured to acquire an idle number of the shared processor resource of the target processor, acquire a required number of the shared processor resource of the target task, and allocate the shared processor resource for the target task according to the idle number and the required number.

In some embodiments, the shared processor resource allocation module 401 is configured to allocate the required number of the shared processor resource to the target task in a case where the idle number is greater than or equal to the required number.

In some embodiments, the shared processor resource allocation module 401 is configured to:

in a case where the idle number is less than the required number, acquire a target difference between the required number and the idle number;

acquire one or more first candidate tasks from tasks currently using the shared processor resource of the target processor according to a task priority, wherein the task priority of the first candidate task is lower than the task priority of the target task;

release the shared processor resource currently used by the one or more first candidate tasks so as to increase the idle number of the shared processor resource of the target processor; and in a case where the increased idle number of the shared processor resources is greater than or equal to the required number, allocate the shared processor resource for the target task according to the required number; or, in a case where the increased idle number of the shared processor resource is less than the required number, allocate shared processor resources for the target task according to the increased idle number of the shared processor resources.

Figure 5:
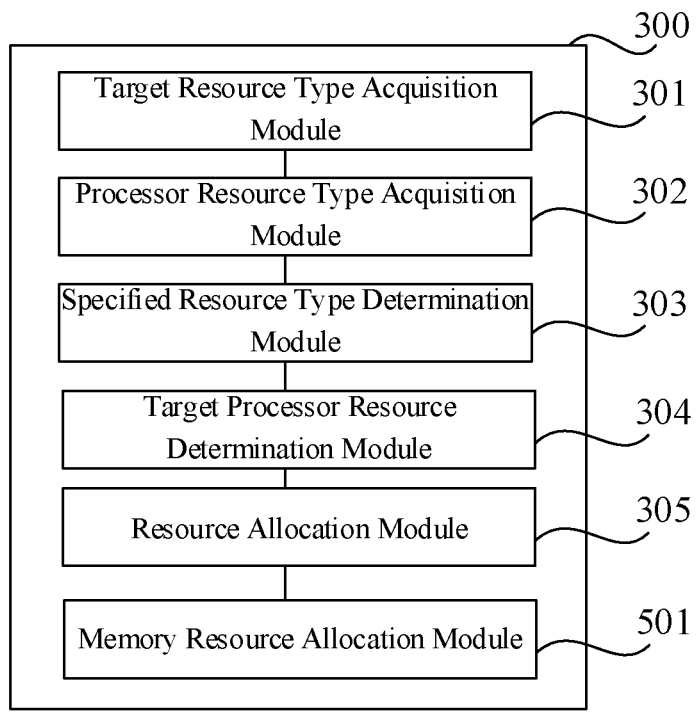
FIG. 5 is a block diagram of yet another resource allocation apparatus illustrated according to an exemplary embodiment.

FIG. 5 is a block diagram of yet another resource allocation apparatus illustrated according to an exemplary embodiment. As shown in FIG. 5, the apparatus further includes:

a memory resource allocation module 501, configured to: for each target task, allocate a memory resource number corresponding to the target resource type to the target task according to a preset resource type-memory correspondence, wherein the preset resource type-memory correspondence includes a preset correspondence between the target resource type and the memory resource number.

In some embodiments, the shared processor resource allocation module 401 is specifically configured to:

take all tasks with task priorities lower than the task priority of the target task as second candidate tasks; and among the second candidate tasks, select third candidate tasks in sequence according to a usage number of shared processor resource in use from large to small until a sum value of the usage numbers of shared processor resources of the selected third candidate tasks is greater than or equal to the target difference, and take the third candidate tasks as the first candidate tasks; or, until all the second candidate tasks are selected as the third candidate tasks, when a sum value of the usage numbers of shared processor resources of the third candidate tasks is still less than the target difference, and take the second candidate tasks as the first candidate tasks.

In some embodiments, the target processor is a GPU, the resource types include a computing resource and an encoding-decoding resource; the target tasks include a machine learning task and a multimedia encoding-decoding task, the target resource type corresponding to the machine learning task is the computing resource, and the resource type corresponding to the multimedia encoding-decoding task is the encoding-decoding resource.

Figure 6:
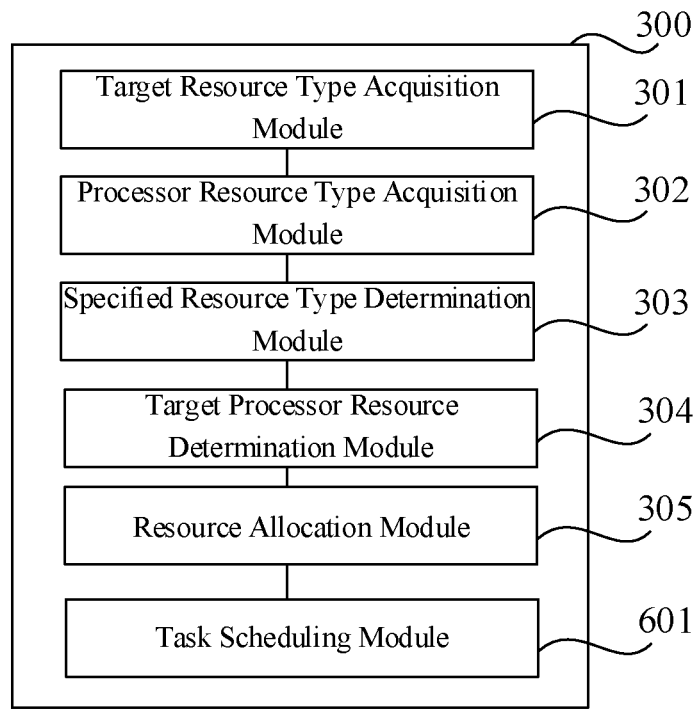
FIG. 6 is a block diagram of still another resource allocation apparatus illustrated according to an exemplary embodiment.

FIG. 6 is a block diagram of still another resource allocation apparatus illustrated according to an exemplary embodiment. As shown in FIG. 6, the apparatus further includes:

a task scheduling module 601, configured to execute a task suspension operation in a case where the target task is a multimedia encoding-decoding task, and schedule the multimedia encoding-decoding task after a suspension time of the multimedia encoding-decoding task reaches a preset suspension time, wherein the task suspension operation is used for suspending the multimedia encoding-decoding task.

To sum up, by adopting the resource allocation apparatus to realize: acquire a target resource type corresponding to a target task; acquire a plurality of resource types of a target processor, wherein each resource type corresponds to one or more virtual processor resources of the target processor; determine a specified resource type that is identical to the target resource type from the plurality of resource types; determine a target processor resource from one or more virtual processor resources corresponding to the specified resource type; and allocate the target processor resource to the target task. In this way, the virtual processor resources of different resource types on a same target processor can be allocated to different target tasks, that is, the plurality of target tasks can use the same target processor in parallel, which improves the resource utilization rate of the processor and also improves the multi-task execution efficiency.

Figure 7:
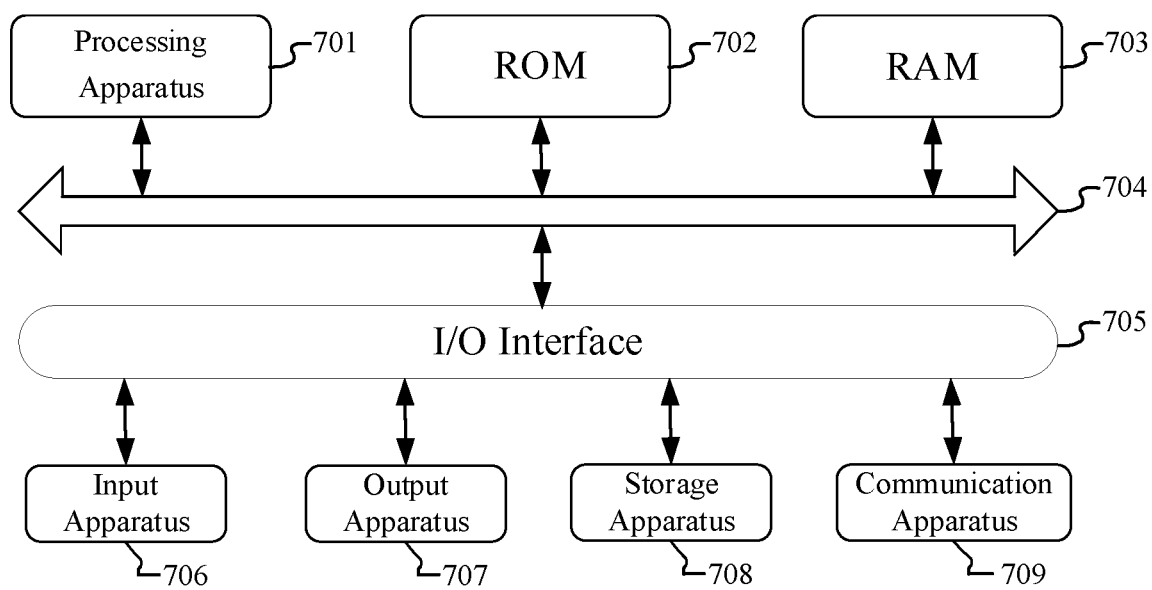
FIG. 7 is a block diagram of an electronic device illustrated according to an exemplary embodiment.

Referring to FIG. 7, FIG. 7 illustrates a schematic structural diagram of an electronic device 700 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 5 is merely an example, and should not pose any limitation to the functions and the range of use of the embodiments of the present disclosure.

As illustrated in FIG. 7, the electronic device 700 may include a processing apparatus 701 (e.g., a central processing unit, a graphics processing unit, etc.), which can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire a target resource type corresponding to a target task; acquire a plurality of resource types of a target processor, wherein each resource type corresponding to one or more virtual processor resources of the target processor; determine a specified resource type that is identical to the target resource type from the plurality of resource types; determine a target processor resource from one or more virtual processor resources corresponding to the specified resource type; and allocate the target processor resource to the target task.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the a target resource type acquisition module may also be described as "a module for acquiring a target resource type corresponding to a target task".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides a resource allocation method, and the method includes:
  acquiring a target resource type corresponding to a target task;
  acquiring a plurality of resource types of a target processor, wherein each resource type corresponds to one or more virtual processor resources of the target processor;
  determining a specified resource type that is identical to the target resource type from the plurality of resource types;
  determining a target processor resource from one or more virtual processor resources corresponding to the specified resource type; and
  allocating the target processor resource to the target task.

According to one or more embodiments of the present disclosure, Example 2 provides the method of Example 1, and determining the target processor resource from one or more virtual processor resources corresponding to the specified resource type includes:
  acquiring one or more idle processor resources without being subjected to task allocation from the virtual processor resource corresponding to the specified resource type; and
  in a case where the number of the idle processor resource is one, taking the idle processor resource as the target processor resource, or,
  in a case where the number of the idle processor resources is plural, selecting one of a plurality of idle processor resources as the target processor resource according to a preset selection rule.

According to one or more embodiments of the present disclosure, selecting one of the plurality of idle processor resources as the target processor resource according to the preset selection rule includes:
  randomly selecting one of the plurality of idle processor resources as the target processor resource in a case where the preset selection rule is random selection; or,
  selecting one idle processor resource with higher-ranking as the target processor resource according to a preset order of the idle processor resources in a case where the preset selection rule is sequential selection.

According to one or more embodiments of the present disclosure, Example 3 provides the method of Example 1, and the target processor further includes a shared processor resource; and the method further includes:
  acquiring an idle number of the shared processor resource of the target processor;
  acquiring a required number of the shared processor resource of the target task; and
  allocating a shared processor resource for the target task according to the idle number and the required number.

According to one or more embodiments of the present disclosure, Example 4 provides the method of Example 3, and allocating the shared processor resource for the target task according to the idle number and the required number includes:
  in a case where the idle number is greater than or equal to the required number, allocating the required number of the shared processor resource to the target task.

According to one or more embodiments of the present disclosure, Example 5 provides the method of Example 4, and allocating the shared processor resource for the target task according to the idle number and the required number includes:
  in a case where the idle number is less than the required number, acquiring a target difference between the required number and the idle number;
  acquiring one or more first candidate tasks from tasks currently using the shared processor resource of the target processor according to a task priority, wherein a task priority of the first candidate task is lower than a task priority of the target task;
  releasing the shared processor resource currently used by the one or more first candidate tasks so as to increase the idle number of the shared processor resource of the target processor; and
  in a case where an increased idle number of shared processor resources is greater than or equal to the required number, allocating the shared processor resource for the target task according to the required number; or, in a case where an increased idle number of shared processor resources is less than the required number, allocating shared processor resources for the target task according to the increased idle number of shared processor resources.

According to one or more embodiments of the present disclosure, acquiring the one or more first candidate tasks according to the task priority includes:
  taking all tasks with task priorities lower than the task priority of the target task as second candidate tasks; and
  among the second candidate tasks, selecting third candidate tasks in sequence according to a usage number of shared processor resources in use from large to small until a sum value of the usage numbers of shared processor resources of the selected third candidate tasks is greater than or equal to the target difference, and taking the third candidate tasks as the first candidate tasks; or, until all the second candidate tasks are selected as the third candidate tasks, when a sum value of the usage numbers of shared processor resources of the third candidate tasks is still less than the target difference, and taking the second candidate tasks as the first candidate tasks.

According to one or more embodiments of the present disclosure, Example 6 provides the method of Example 1, and the method further includes:
  for each target task, allocating a memory resource number corresponding to the target resource type to the target task according to a preset resource type-memory correspondence, wherein the preset resource type-memory correspondence includes a preset correspondence between the target resource type and the memory resource number.

According to one or more embodiments of the present disclosure, Example 7 provides the method described in any one of Examples 1 to 6, wherein the target processor is a GPU, and the resource types include a computing resource and an encoding-decoding resource; and the target task includes a machine learning task and a multimedia encoding-decoding task, the target resource type corresponding to the machine learning task is the computing resource, and the resource type corresponding to the multimedia encoding-decoding task is the encoding-decoding resource.

According to one or more embodiments of the present disclosure, Example 8 provides the method of Example 7, and the method further includes:

in a case where the target task is the multimedia encoding-decoding task, executing a task suspension operation, and the task suspension operation being used for suspending the multimedia encoding-decoding task; and scheduling the multimedia encoding-decoding task after a suspension time of the multimedia encoding-decoding task reaches a preset suspension time.

According to one or more embodiments of the present disclosure, Example 9 provides a resource allocation apparatus, and the apparatus includes:

a target resource type acquisition module, configured to acquire a target resource type corresponding to a target task;

a processor resource type acquisition module, configured to acquire a plurality of resource types of a target processor, wherein each resource type corresponds to one or more virtual processor resources of the target processor;

a specified resource type determination module, configured to determine a specified resource type that is identical to the target resource type from the plurality of resource types;

a target processor resource determination module, configured to determine a target processor resource from one or more virtual processor resources corresponding to the specified resource type; and a resource allocation module, configured to allocate the target processor resource to the target task.

According to one or more embodiments of the present disclosure, Example 10 provides a computer-readable medium, the computer-readable medium stores a computer program; and when the computer program is executed by a processing apparatus, steps of the methods described in Examples 1 to 8 are implemented.

According to one or more embodiments of the present disclosure, Example 11 provides an electronic device and the electronic device includes: a storage apparatus storing a computer program; and a processing apparatus configured to execute the computer program on the storage apparatus to implement steps of the methods described in Examples 1 to 8.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A resource allocation method, comprising:

acquiring, by a computer, a target resource type corresponding to a target task, wherein the target task comprises at least one of a machine learning task and a multimedia encoding-decoding task;

segmenting, by the computer, a target processor into a plurality of virtual processor resources corresponding to a plurality of resource types and generating meta information for each of the plurality of virtual processor resources, wherein the meta information includes a resource type of the virtual processor resource, resource identification of the virtual processor resource, resource status of the virtual processor resource and resource quantity of the virtual processor resource;

acquiring, by the computer, the plurality of resource types of the target processor, wherein each resource type corresponds to one or more virtual processor resources of the target processor, and wherein the target processor is a graphical processing unit (GPU) and the plurality of resource types comprise a computing resource and an encoding-decoding resource;

determining, by the computer, a specified resource type that is identical to the target resource type from the plurality of resource types;

determining, by the computer, a target processor resource form one or more virtual processor resources corresponding to the specified resource type; and allocating, by the computer, the target processor resource to the target task;

wherein the target processor further comprises shared processor resources, and the shared processor resources are used to process the machine learning task and the multimedia encoding-decoding task;

the method further comprises:

acquiring, by the computer, an idle number of the shared processor resources of the target processor, acquiring, by the computer, a required number of the shared processor resources corresponding to the target task, and allocating, by the computer, the shared processor resources for the target task according to the idle number and the required number, the method further comprises:

in response to the target task being the multimedia encoding-decoding task, executing a task suspension operation to release shared processor resources currently used by the multimedia encoding-decoding task for use by the machine learning task, wherein the task suspension operation is used for suspending the multimedia encoding-decoding task for a preset suspension time; and scheduling the multimedia encoding-decoding task after a suspension time of the multimedia encoding-decoding task reaches the preset suspension time.

2. The method according to claim 1, wherein determining the target processor resource from the one or more virtual processor resources corresponding to the specified resource type comprises:
  acquiring one or more idle processor resources without being subjected to task allocation from the one or more virtual processor resource corresponding to the specified resource type; and
  in a case where the number of the idle processor resources is one, taking the one idle processor resource as the target processor resource, or,
  in a case where the number of the idle processor resources is plural, selecting one of a plurality of idle processor resources as the target processor resource according to a preset selection rule.

3. The method according to claim 1, wherein allocating the shared processor resources for the target task according to the idle number and the required number comprises:
  in a case where the idle number is greater than or equal to the required number, allocating one or more shared processor resources, a number of which is equal to the required number, to the target task.

4. The method according to claim 1, wherein allocating the shared processor resources for the target task according to the idle number and the required number comprises:
  in a case where the idle number is less than the required number, acquiring a target difference between the required number and the idle number;
  acquiring one or more first candidate tasks from tasks currently using the shared processor resources of the target processor according to a task priority, wherein a task priority of each first candidate task of the one or more first candidate tasks is lower than a task priority of the target task;
  releasing the shared processor resources currently used by the one or more first candidate tasks so as to increase the idle number of the shared processor resources of the target processor; and
  in a case where an increased idle number of shared processor resources is greater than or equal to the required number, allocating the shared processor resources for the target task according to the required number; or, in a case where an increased idle number of shared processor resources is less than the required number, allocating the shared processor resources for the target task according to the increased idle number of shared processor resources.

5. The method according to claim 1, wherein the method further comprises:
  for each target task, allocating a memory resource number corresponding to the target resource type to the target task according to a preset resource type-memory correspondence, wherein the preset resource type-memory correspondence comprises a preset correspondence between the target resource type and the memory resource number.

6. The method according to claim 1, wherein the target resource type corresponding to the machine learning task is the computing resource, and the resource type corresponding to the multimedia encoding-decoding task is the encoding-decoding resource.

7. The method according to claim 2, wherein selecting one of the plurality of idle processor resources as the target processor resource according to the preset selection rule comprises:
  randomly selecting one of the plurality of idle processor resources as the target processor resource in a case where the preset selection rule is random selection; or,
  selecting one idle processor resource with higher-ranking as the target processor resource according to a preset order of the idle processor resources in a case where the preset selection rule is sequential selection.

8. The method according to claim 4, wherein acquiring the one or more first candidate tasks according to the task priority comprises:
  taking all tasks with task priorities lower than the task priority of the target task as second candidate tasks; and
  among the second candidate tasks, selecting third candidate tasks in sequence according to a usage number of shared processor resources in use from large to small until a sum value of the usage numbers of shared processor resources of the selected third candidate tasks is greater than or equal to the target difference, and taking the third candidate tasks as the first candidate tasks; or, until all the second candidate tasks are selected as the third candidate tasks, when a sum value of the usage numbers of shared processor resources of the third candidate tasks is still less than the target difference, and taking the second candidate tasks as the first candidate tasks.

9. The method according to claim 2, wherein the target resource type corresponding to the machine learning task is the computing resource, and the resource type corresponding to the multimedia encoding-decoding task is the encoding-decoding resource.

10. The method according to claim 3, wherein the target resource type corresponding to the machine learning task is the computing resource, and the resource type corresponding to the multimedia encoding-decoding task is the encoding-decoding resource.

11. The method according to claim 5, wherein the target resource type corresponding to the machine learning task is the computing resource, and the resource type corresponding to the multimedia encoding-decoding task is the encoding-decoding resource.

12. A non-transitory computer-readable medium, wherein a computer program is stored on the non-transitory computer-readable medium, and when the computer program is executed by a processing apparatus, a resource allocation method is implemented,
  wherein the method comprises:
  acquiring a target resource type corresponding to a target task, wherein the target task comprises at least one of a machine learning task and a multimedia encoding-decoding task;
  segmenting a target processor into a plurality of virtual processor resources corresponding to a plurality of resource types and generating meta information for each of the plurality of virtual processor resources, wherein the meta information includes a resource type of the virtual processor resource, resource identification of the virtual processor resource, resource status of the virtual processor resource and resource quantity of the virtual processor resource;
  acquiring the plurality of resource types of the target processor, wherein each resource type corresponds to one or more virtual processor resources of the target processor, and wherein the target processor is a graphical processing unit (GPU) and the plurality of resource type comprise a computing resource and an encoding-decoding resource, determining a specified resource type that is identical to the target resource type from the plurality of resource types;

determining a target processor resource from one or more virtual processor resources corresponding to the specified resource type; and allocating the target processor resource to the target task;

wherein the target processor further comprises shared processor resources, and the shared processor resources are used to process the machine learning task and the multimedia encoding-decoding task;

the method further comprises:

acquiring an idle number of the shared processor resources of the target processor;

acquiring a required number of the shared processor resources corresponding to the target task, and allocating the shared processor resources for the target task according to the idle number and the required number;

the method further comprises:

in response to the target task being the multimedia encoding-decoding task, executing a task suspension operation to release shared processor resources currently used by the multimedia encoding-decoding task for use by the machine learning task, wherein the task suspension operation is used for suspending the multimedia encoding-decoding task for a preset suspension time; and scheduling the multimedia encoding-decoding task after a suspension time of the multimedia encoding-decoding task reaches the preset suspension time.

13. An electronic device, comprising:

a storage apparatus, wherein a computer program is stored on the storage apparatus; and a processing apparatus, configured to execute the computer program on the storage apparatus to implement a resource allocation method, wherein the method comprises:

acquiring a target resource type corresponding to a target task, wherein the target task comprises at least one of a machine learning task and a multimedia encoding-decoding task;

segmenting a target processor into a plurality of virtual processor resources corresponding to a plurality of resource types and generating meta information for each of the plurality of virtual processor resources, wherein the meta information includes a resource type of the virtual processor resource, resource identification of the virtual processor resource, resource status of the virtual processor resource and resource quantity of the virtual processor resource;

acquiring the plurality of resource types of the target processor, wherein each resource type corresponds to one or more virtual processor resources of the target processor, and wherein the target processor is a graphical processing unit (GPU) and the plurality of resource type comprise a computing resource and an encoding-decoding resource;

determining a specified resource type that is identical to the target resource type form the plurality of resource types;

determining a target processor resource from one or more virtual processor resources corresponding to the specified resource type; and allocating the target processor resource to the target task;

wherein the target processor further comprises shared processor resources, and the shared processor resources are used to process the machine learning task and the multimedia encoding-decoding task;

the method further comprises:

acquiring an idle number of the shared processor resources of the target processor;

acquiring a required number of the shared processor resources corresponding to the target task; and allocating the shared processor resources for the target task according to the idle number and the required number;

the method further comprises:

in response to the target task being the multimedia encoding-decoding task, executing a task suspension operation to release shared processor resources currently used by the multimedia encoding-decoding task for use by the machine learning task wherein the task suspension operation is used for suspending the multimedia encoding-decoding task for a preset suspension time; and scheduling the multimedia encoding-decoding task after a suspension time of the multimedia encoding-decoding task reaches the preset suspension time.

14. The electronic device according to claim 13, wherein determining the target processor resource from the one or more virtual processor resources corresponding to the specified resource type in the method comprises:

acquiring one or more idle processor resources without being subjected to task allocation from the one or more virtual processor resource corresponding to the specified resource type; and in a case where the number of the idle processor resources is one, taking the one idle processor resource as the target processor resource, or, in a case where the number of the idle processor resources is plural, selecting one of a plurality of idle processor resources as the target processor resource according to a preset selection rule.

15. The electronic device according to claim 13, wherein allocating the shared processor resources for the target task according to the idle number and the required number comprises:

in a case where the idle number is greater than or equal to the required number, allocating one or more shared processor resources, a number of which is equal to the required number, to the target task.

16. The electronic device according to claim 15, wherein allocating the shared processor resources for the target task according to the idle number and the required number comprises:

in a case where the idle number is less than the required number, acquiring a target difference between the required number and the idle number;

acquiring one or more first candidate tasks from tasks currently using the shared processor resources of the target processor according to a task priority, wherein a task priority of each first candidate task of the one or more first candidate tasks is lower than a task priority of the target task;

releasing the shared processor resources currently used by the one or more first candidate tasks so as to increase the idle number of the shared processor resources of the target processor; and in a case where an increased idle number of shared processor resources is greater than or equal to the required number, allocating the shared processor resources for the target task according to the required number; or, in a case where an increased idle number of shared processor resources is less than the required number, allocating shared processor resources for the target task according to the increased idle number of shared processor resources.

17. The electronic device according to claim 13, wherein the method further comprises:
for each target task, allocating a memory resource number corresponding to the target resource type to the target task according to a preset resource type-memory correspondence, wherein the preset resource type-memory correspondence comprises a preset correspondence between the target resource type and the memory resource number.

18. The electronic device according to claim 14, wherein selecting one or the plurality of idle processor resources as the target processor resource according to the preset selection rule comprises:
randomly selecting one of the plurality of idle processor resources as the target processor resource in a case where the preset selection rule is random selection; or, selecting one idle processor resource with higher-ranking as the target processor resource according to a preset order of the idle processor resources in a case where the preset selection rule is sequential selection.

19. The electronic device according to claim 16, wherein acquiring the one or more first candidate tasks according to the task priority comprises:
taking all tasks with task priorities lower than the task priority of the target task as second candidate tasks; and
among the second candidate tasks, selecting third candidate tasks in sequence according to a usage number of shared processor resources in use from large to small until a sum value of the usage numbers of shared processor resources of the selected third candidate tasks is greater than or equal to the target difference, and taking the third candidate tasks as the first candidate tasks; or, until all the second candidate tasks are selected as the third candidate tasks, when a sum value of the usage number of shared processor resources of the third candidate tasks is still less than the target difference, and taking the second candidate tasks as the first candidate tasks.

* * * * *